United States Patent [19]
Müller et al.

[11] Patent Number: 5,186,584
[45] Date of Patent: Feb. 16, 1993

[54] TWIST DRILL

[75] Inventors: Gebhard Müller, Fürth; Simon Escher, Ingolstadt, both of Fed. Rep. of Germany

[73] Assignee: Hertel AG Werkzeuge & Hartstoffe, Fürth, Fed. Rep. of Germany

[21] Appl. No.: 688,587

[22] PCT Filed: Oct. 31, 1990

[86] PCT No.: PCT/DE90/00827
§ 371 Date: Jun. 27, 1991
§ 102(e) Date: Jun. 27, 1991

[87] PCT Pub. No.: WO91/06387
PCT Pub. Date: May 16, 1991

[30] Foreign Application Priority Data

Oct. 31, 1989 [DE] Fed. Rep. of Germany ... 8912860[U]

[51] Int. Cl.⁵ .............................................. B23B 51/08
[52] U.S. Cl. .................................... 408/26; 408/224; 408/230
[58] Field of Search ................ 408/22, 26, 27, 224, 408/225, 230, 223, 715

[56] References Cited

U.S. PATENT DOCUMENTS

| | | | |
|---|---|---|---|
| 1,471,866 | 10/1923 | Simpson | 408/224 |
| 3,122,947 | 3/1964 | Cogsdill . | |
| 4,589,310 | 5/1986 | Neumann | 408/158 X |
| 4,589,805 | 5/1986 | Duffner | 408/22 X |
| 4,842,451 | 6/1989 | Dugger | 408/21 |

Primary Examiner—Steven C. Bishop
Attorney, Agent, or Firm—Spencer, Frank & Schneider

[57] ABSTRACT

A twist drill has a cutting member at the bottom, a shaft at the top, and a reduced-diameter root clearance region between the cutting member and the shaft. Cutting edges are provided at the transition between the cutting member and the root clearance region, and further cutting edges are provided at the transition between the shaft and the root clearance region. After a throughhole has been drilled using the cutting member, the drill is displaced laterally and moved along a circular path while it is still rotating. As a result, the cutting edges at the transition between the cutting member and the root clearance region countersink the bottom end of the throughhole. A similar procedure is employed to countersink the top end of the throughhole using the further cutting edges at the transition between the shaft and the root clearance region.

18 Claims, 2 Drawing Sheets

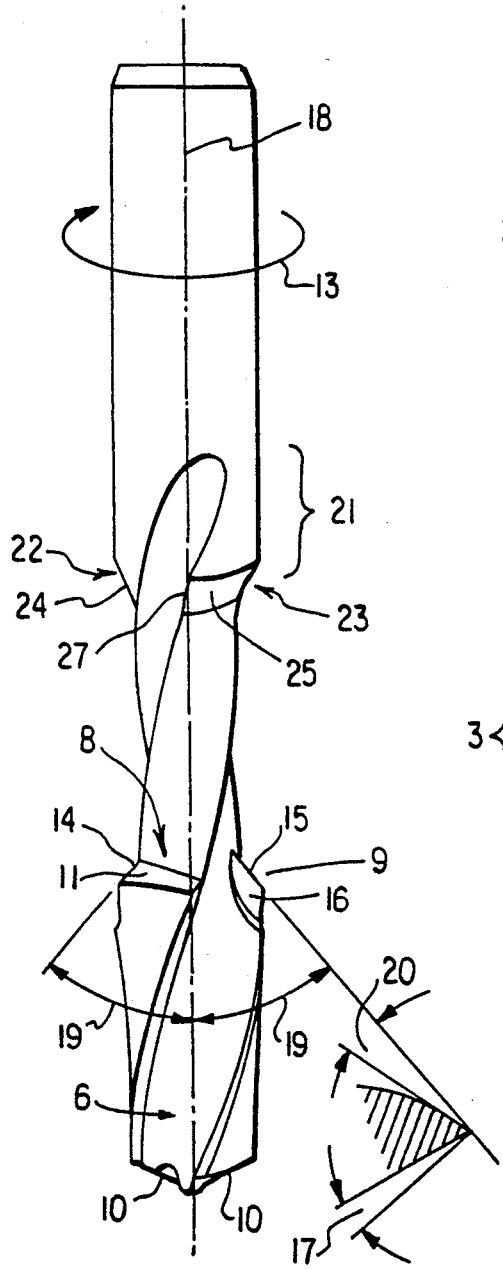
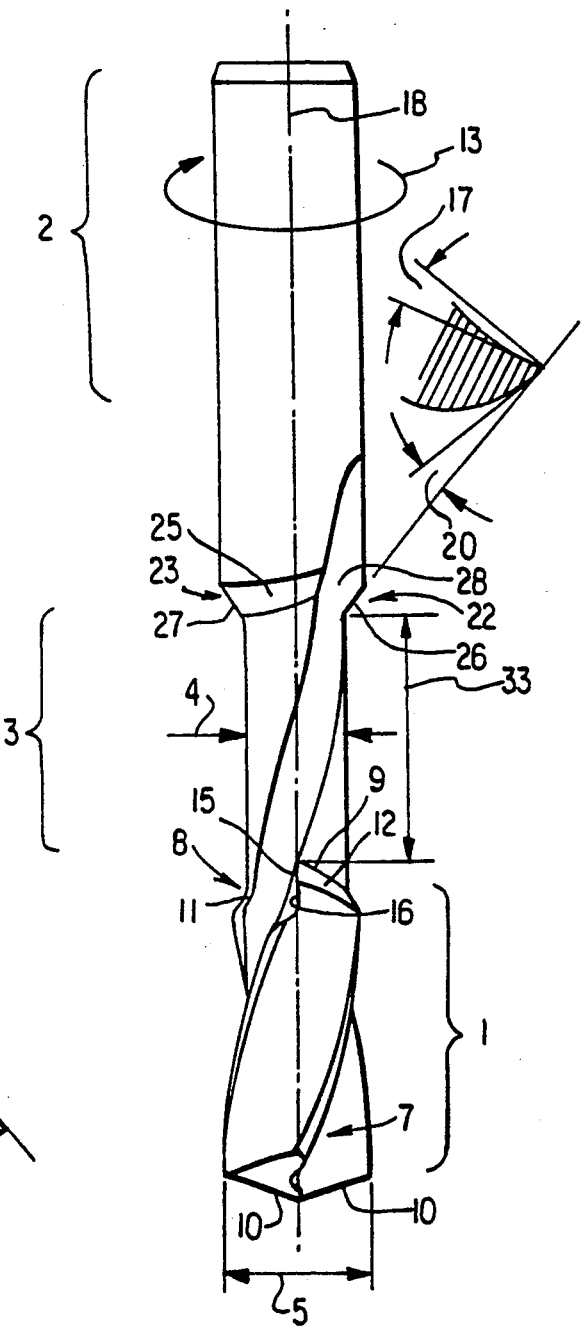

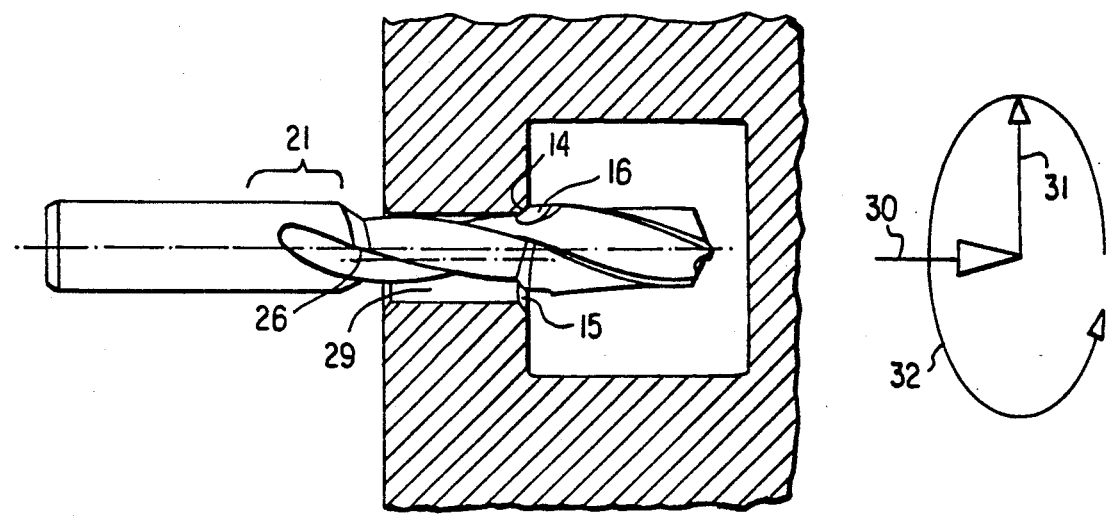
FIG. 3A
FIG. 3B
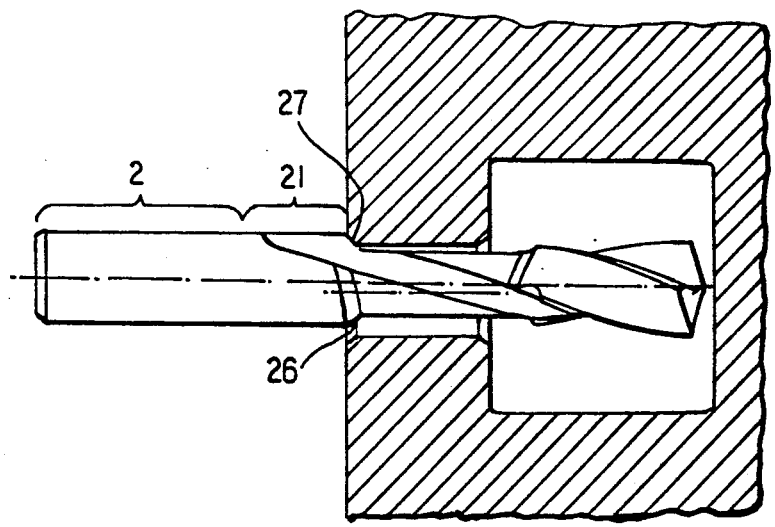
FIG. 4

TWIST DRILL

BACKGROUND OF THE INVENTION

The invention relates to a twist drill, particularly a drill made of solid hard metal.

It is known in principle to equip a twist drill with a countersinking device for the drilling of throughholes. This countersinking device is used after the production of a throughhole and provides the bore hole with a countersunk opening. Such a twist drill, equipped with a countersinking device that can be radially folded away, is structurally complicated and, since a certain structural space is needed, can be realized only on drills of a certain diameter.

SUMMARY OF THE INVENTION

An object of the invention is to provide a twist drill of the above mentioned type, configured so that it is able to produce a throughhole having a countersunk opening without the countersinking element being a separate component that has to be folded away and thus requires a complicated folding mechanism. A related object is to provide such a drill for use in the modern machine tool art, where path controlled milling machines, that is, CNC (computerized numerical control) milling machines, are employed for drilling such throughholes.

These objects can be attained by providing a twist drill which is characterized in that, in its region facing away from the drill cutting edges, the cutting member of the drill has a step forming a root clearance region, with the diameter of the root clearance region being greater than the core diameter but less than the drill diameter; in that transition stages are disposed between the spiral grooves of the drill and extend from the cutting member into the root clearance region, the transition stages being configured as ring segment faces which slope the direction toward the drill cutting edges and which have surface regions that conform approximately to regions on the surface of a cone; in that chip breaker grooves are provided at the spiral groove edges adjacent the ring segment faces in the cutting direction for forming undercutting edges; and in that cutting faces are provided adjacent the undercutting edges and extend from the outer portion of the cutting member into the spiral grooves. With such a twist drill, the countersinking feature can be easily realized by way of a circular milling process using a CNC milling machine. The twist drill is made of one piece and, thanks to its configuration according to the invention, is effective as a drill during the production of the throughhole and as a miller (namely, as a circular miller) during the production of the countersunk portion. By employing the special chip breaker grooves for the countersinking, an excessively negative rake angle on the order of magnitude of −30° as a function of the helix angle of the spiral groove is avoided. The rake angle of the chip breaker groove preferably lies between +10° and −10°. The length of the root clearance region must of course be dimensioned in such a way that countersinking becomes possible at all. That is, the root clearance region must have at least the same length as the throughhole to be drilled (and better yet, a length greater than the length of the throughhole).

Another feature provides that the shoulders of the recess facing away from the drill cutting edges for countersinking the upper end of the throughhole are also configured for circular milling. This embodiment may be provided separately by itself, without the other recess shoulders being configured for countersinking.

BRIEF DESCRIPTION OF THE DRAWINGS

FIG. 1 is a side view of a twist drill in accordance with the invention;

FIG. 2 is a side view of the drill according to FIG. 1, rotated 90° about the drill axis in the direction of the cut;

FIG. 3A is a schematic representation of the drill during countersinking by way of circular milling;

FIG. 3 schematically illustrates the path of the drill during the countersinking procedure; and FIG. 4 is an illustration of the drill during forward sinking by way of circular milling.

DESCRIPTION OF THE PREFERRED EMBODIMENT

FIG. 1 illustrates a twist drill in accordance with the present invention, and FIG. 2 illustrates the twist drill rotated by 90°. In its longitudinal extent, the twist drill is essentially composed of a cutting member 1, a shaft 2, and a root clearance region 3 therebetween. Root clearance region 3 forms a step having a reduced diameter 4, which is greater than the core diameter of the drill but less than the drill diameter 5. Transition stages 8 and 9 are disposed between spiral grooves 6 and 7 and extend from cutting member 1 to root clearance region 3. Transition stages 8 and 9 are respectively configured as ring segment faces 11 and 12, which slope downward in the direction toward the drill cutting edges 10 and which have surface regions that conform approximately to regions on the surface of a cone. Chip breaker grooves for forming undercutting edges 14 and 15 are provided in the flanks of spiral grooves 6 and 7 adjacent the ring segment faces 11 and 12. Edges 14 and 15 are positioned to cut a workpiece when the drill is rotated in a cutting direction 13. Each undercutting edge is associated with a cutting face 16 that extends radially inwardly from the outer portion of cutting member 1, beyond the diameter 4 of the root clearance region, into spiral groove 6 or 7, respectively. The surfaces of the cutting faces 16 are planar. Their rake angle 17 lies between +10° and −10°.

The undercutting edges 14 and 15 each form an angle 19 of about 45° with drill axis 18.

In order to form a clearance angle 20, the ring segment faces 11, 12 are slightly twisted around the drill axis 18 in a direction opposite to the twisting direction of spiral grooves 6, 7.

The length 33 of root clearance region 3 approximately corresponds to the cutting length of cutting member 1.

Between shaft 2 and root clearance region 3 there lies a further cutting member 21. The transition stages 22 and 23 are disposed between spiral grooves 6 and 7 and extend from the further cutting member 21 into root clearance region 3. Transition stages 22 and 23 are configured as ring segment faces 24 and 25 which slope upward in the direction away from drill cutting edges 10 and have surface regions that conform approximately to regions on the surface of a cone. Chip breaker grooves are also provided in the flanks of spiral grooves 6 and 7 adjacent the ring segment faces 24 and 25 in order to form overcutting edges 26 and 27. Each overcutting edge is associated with a cutting face 28 that extends radially inwardly from the outer portion of further cutting member 21 into spiral groove 6 or 7, respectively.

For countersinking, throughhole 29 (FIG. 3A) is initially drilled in an axial feeding direction 30 (FIG. 3B). Then, for countersinking by circular milling, the drill is laterally displaced in lateral direction 31. Thereafter, while the drill continues to rotate in the cutting direction 13, it is moved in a circular direction 32, that is, on a circular arc around the center axis of the drilled hole along the annular edge of the exit opening of throughhole 29.

In an analogous manner, the overcutting edges 26 and 27 of the further cutting member 21 are employed to produce, by way of circular milling, an annular recess at the entrance opening of a throughhole 29 (FIG. 4). For this purpose the drill is advanced even further in feeding direction 30.

What we claim is:

1. A twist drill having a cutting direction, comprising: an elongated piece of solid metal having an end with cutting edges, a cutting member adjacent the end, a root clearance region adjacent the cutting member, and transition stages between the cutting member and the root clearance region, wherein at least the cutting member has spiral grooves, wherein the cutting member and the root clearance region have outermost portions with respective diameters, the diameter of the outermost portion of the root clearance region being smaller than the diameter of the outermost portion of the cutting member, wherein the transition stages are disposed between the spiral grooves and are configured as ring segment faces which slope in the direction of the cutting edges, and wherein cutting faces are provided adjacent the ring segment faces in the cutting direction of the drill to form undercutting edges, the cutting faces extending into the spiral grooves, from the outermost portion of the cutting member to respective positions inward of the diameter of the outermost portion of the root clearance region.

2. The twist drill of claim 1, wherein the ring segment faces have surface configurations that conform approximately to regions on the surface of a cone.

3. The twist drill of claim 1, wherein the cutting faces have planar surfaces.

4. The twist drill of claim 1, wherein the cutting faces have a rake angle, the rake angle of the cutting faces being between about $+10°$ and about $-10°$.

5. The twist drill of claim 1, wherein the drill has an axis, wherein the spiral grooves have a twisting direction, and wherein the ring segment faces are twisted slightly around the drill axis in the direction opposite to the twisting direction of the spiral grooves.

6. The twist drill of claim 1, wherein the root clearance region has predetermined length, wherein the cutting member has a cutting length, and wherein the length of the root clearance region corresponds approximately to the cutting length of the cutting member.

7. The twist drill of claim 1, wherein the elongated piece of solid metal additionally has a shank adjacent the root clearance region, the root clearance region being disposed between the shank and the cutting member, the shank having an outermost portion with a diameter that is larger than the diameter of the outermost portion of the root clearance region, and further transition stages between the shank and the root clearance region, wherein the spiral grooves extend from the cutting member, through the root clearance region, and into the shank, wherein the further transition stages are disposed between the spiral grooves and are configured as further ring segment faces which slope in the direction away from the cutting edges, and wherein further cutting faces are provided adjacent the further ring segment faces in the cutting direction of the drill to form over cutting edges, the further cutting faces extending into the spiral grooves, from the outermost portion of the shank to respective positions inward of the diameter of the outermost portion of the root clearance region.

8. The twist drill of claim 7, wherein the further ring segment faces have surface configurations that conform approximately to regions on the surface of a cone.

9. The twist drill of claim 1, wherein the elongated piece of solid metal additionally has a longitudinal axis that runs through the end with cutting edges, both the cutting member and the root clearance region being symmetrical with respect to the longitudinal axis.

10. The twist drill of claim 9, wherein the spiral grooves are two in number, wherein the ring segment faces are two in number and have identical sizes and shapes, the ring segment faces being disposed symmetrically with respect to the longitudinal axis, and wherein the cutting faces are two in number and have identical sizes and shapes, the cutting faces being disposed symmetrically with respect to the longitudinal axis.

11. A twist drill having a cutting direction, comprising: an elongated piece of solid metal having an end with cutting edges, a cutting member adjacent the end, a root clearance region adjacent the cutting member, and transition stages between the cutting member and the root clearance region, wherein at least the cutting member has spiral grooves, wherein the cutting member and the root clearance region have outermost portions with respective diameters, the diameter of the outermost portion of the root clearance region being smaller than the diameter of the outermost portion of the cutting member, wherein the transition stages are disposed between the spiral grooves and are configured as ring segment faces which slope in the direction of the cutting edges, the ring segment faces having surface configurations that conform approximately to regions on the surface of a cone, and wherein cutting faces are provided adjacent the ring segment faces in the cutting direction of the drill to form undercutting edges, the cutting faces extending into the spiral grooves, from the outermost portion of the cutting member to respective positions inward of the diameter of the outermost portion of the root clearance region, the cutting faces having a rake angle between about $+10°$ and $-10°$.

12. The twist drill of claim 11, wherein the cutting faces have planar surfaces.

13. The twist drill of claim 11, wherein the drill has an axis, wherein the spiral grooves have a twisting direction, and wherein the ring segment faces are twisted slightly around the drill axis in the direction opposite to the twisting direction of the spiral grooves.

14. The twist drill of claim 11, wherein the root clearance region has predetermined length, wherein the cutting member has a cutting length, and wherein the length of the root clearance region corresponds approximately to the cutting length of the cutting member.

15. The twist drill of claim 11, wherein the elongated piece of solid metal additionally has a shank adjacent the root clearance region, the root clearance region being disposed between the shank and the cutting member, the shank having an outermost portion with a diameter that is larger than the diameter of the outermost portion of the root clearance region, and further transition stages between the shank and the root clearance region, wherein the spiral grooves extend from the cutting member, through the root clearance region, and into the shank, wherein the further transition stages are disposed between the spiral grooves and are configured as further ring segment faces which slope in the direction away from the cutting edges, and wherein further cutting faces are provided adjacent the further ring segment faces in the cutting direction of the drill to form overcutting edges, the further cutting faces extending into the spiral grooves, from the outermost portion of the shank to respective positions inward of the diameter of the outermost portion of the root clearance region.

16. The twist drill of claim 15, wherein the further ring segment faces have surface configurations that conform approximately to regions on the surface of a cone.

17. The twist drill of claim 11, wherein the elongated piece of solid metal additionally has a longitudinal axis that runs through the end with cutting edges, both the cutting member and the root clearance region being symmetrical with respect to the longitudinal axis.

18. The twist drill of claim 17, wherein the spiral grooves are two in number, wherein the ring segment faces are two in number and have identical sizes and shapes, the ring segment faces being disposed symmetrically with respect to the longitudinal axis, and wherein the cutting faces are two in number and have identical sizes and shapes, the cutting faces being disposed symmetrically with respect to the longitudinal axis.

* * * * *